United States Patent [19]
Ohnmacht et al.

[11] 4,095,086
[45] June 13, 1978

[54] VAPORIZING AND WARMING DEVICE FOR BEVERAGE-PREPARING MACHINES

[75] Inventors: Helmut Ohnmacht; Ernst Brechner, both of Kandel, Germany

[73] Assignee: Firma Fritz Eichenauer, Germany

[21] Appl. No.: 668,402

[22] Filed: Mar. 19, 1976

[30] Foreign Application Priority Data

Jul. 11, 1975 Germany .............................. 2530967

[51] Int. Cl.$^2$ .......................... A47J 31/44; H05B 3/00 F24H/1/10
[52] U.S. Cl. ...................................... 219/283; 99/307; 219/301; 219/302
[58] Field of Search ...................................99/288, 302, 99/304–315; 219/296–299, 301–305, 311, 283, 335–338; 126/5, 54

[56] References Cited

U.S. PATENT DOCUMENTS

| | | | |
|---|---|---|---|
| 3,691,934 | 9/1972 | Horn | 99/307 |
| 3,711,681 | 1/1973 | Leuschner | 99/288 |
| 3,953,923 | 5/1976 | Rygmyr | 219/302 |

*Primary Examiner*—Harvey C. Hornsby
*Assistant Examiner*—Robert Pous
*Attorney, Agent, or Firm*—Craig & Antonelli

[57] ABSTRACT

A vaporizing and warming device for beverage-preparing machines, such as household coffee machines and the like of the type which include a hot plate for keeping the prepared beverage warm, a vaporizer tube carrying water for preparing the beverage and a heating element for transferring the heat required for the respective vaporization and warming processes. The heating element is thermally conductively connected with the vaporizer tube and is arranged together with the vaporizer tube at one side, preferably the underside of a horizontally extending hot plate. The heating element is arranged laterally offset with respect to the vaporizer tube and with its apex at a perpendicular distance from the hot plate which is smaller than the height of the vaporizer tube perpdendicularly to the hot plate, whereby conductive heat transfer from the heating element to the hot plate is avoided while still providing heat to the vaporizer tube, which vaporizer tube is in contact with the hot plate.

14 Claims, 5 Drawing Figures

VAPORIZING AND WARMING DEVICE FOR BEVERAGE-PREPARING MACHINES

BACKGROUND AND SUMMARY OF THE INVENTION

This invention relates to a vaporizing and warming device for beverage-preparing machines, especially for household coffee machines of the type with a hot plate for keeping the thus-prepared beverage warm, a vaporizer tube carrying the water for the beverage, and a tubular heating element yielding the heat required for the vaporization and warming process. This heating element is thermally conductively connected with the vaporizer tube and is arranged together with the vaporizer tube on the underside of the hot plate.

In devices of this type it has been contemplated to arrange the vaporizer tube and the tubular heating element side-by-side and attached together to the underside of the hot plate. In another system it has been contemplated to dispose the tubular heating element and the vaporizer tube side-by-side in grooves of a solid hot plate and to fix the heating element and vaporizer tube in position by a flanging over of the groove rim. It has also been contemplated to cast the tubular heating element and the vaporizer tube into the hot plate, e.g. of aluminum.

Since the housings of such beverage-preparing machines generally consist of a synthetic resin (plastic), care must be taken that the hot plate, which is in contact with the housing or is arranged in the close vicinity thereof, does not reach a temperature leading to a discoloration, brittleness, or even destruction of the synthetic resin. In contrast to this prerequisite is the requirement that, on the one hand, the tubular heating element must possess the high temperature and heat transfer ability necessary for the evaporation of the water in the vaporizer tube, and, on the other hand, the hot plate is to assume a temperature sufficient to keep the beverage warm. These requirements, one contrary to the other, are not met under practical conditions, or are achieved to only an unsatisfactory degree, so that damage to the plastic housings occurs repeatedly, especially after a longer operating time.

This invention is based, at least in part, on the problem of fashioning a unit of the aforedescribed construction so that the plastic housing of the beverage-preparing machine does not suffer any damage and also does not become unattractive due to discoloration.

This problem is solved according to the invention by providing that the tubular heating element is arranged to be laterally offset with regard to the vaporizer tube and with the apex of the tubular heating element having a spacing from the hot plate which is smaller than the height of the vaporizer tube perpendicularly to the hot plate. Due to the fact that the tubular heating element is, on the other hand, connected with the vaporizer tube, and the latter is arranged on the underside of the hot plate, a heat transfer takes place from the tubular heating element via the vaporizer tube and/or the water contained therein to the hot plate. Inasmuch as the temperature of the water and/or of the steam in the vaporizer tube normally will not exceed 100° C., the vaporizer tube assumes, at least at the locations where it is not heat-conductively connected with the tubular heating element, at most this temperature of the water or steam. This temperature, which thus is at most 100° C., is further reduced due to the heat transfer to the hot plate, so that the hot plate, though having the temperature required to keep the beverage warm, does not assume such a temperature value which could lead to an impairment of the plastic housing.

The invention achieves still another effect. The hot plate according to preferred embodiments of the invention does not consist of solid, anodized aluminum but rather consists of a steel plate. Heretofore, such steel plates had to be aftertreated galvanically. Due to the fact that the invention has made a lower temperature possible and, in contrast to conventional systems, there are no local hot spots on the hot plate, the galvanic treatment can be replaced by a varnish (enamel) and/or paint application. This results, on the one hand, in savings during the manufacturing process and, on the other hand, provides novel esthetic design possibilities for such beverage-preparing machines.

According to one preferred embodiment of the invention, the vaporizer tube has a polygonal cross section and rests flat on the hot plate. This results in a good heat transfer for the hot plate. Furthermore, the invention makes it possible to employ tubular heating elements of greater efficiency, i.e. to obtain a more rapid vaporization, without the latter manifesting itself in a temperature increase at the hot plate.

Further, the present invention also contemplates embodiments with tubular heating element likewise fashioned to be polygonal. In this case, the element is advantageously arranged so that it faces the hot plate with one of its edges (edges at intersection of flat sides); thus, the radiant heat of the tubular heating element directly effective on the hot plate cannot lead, in turn, to local hot spots.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
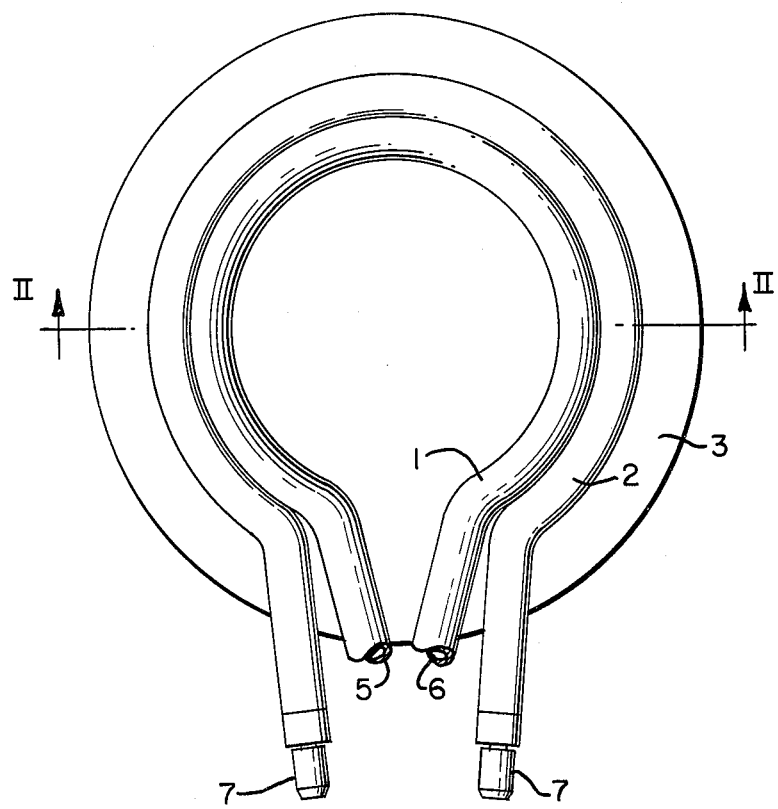
FIG. 1 is a bottom plan view of a preferred embodiment of a unit constructed in accordance with the present invention.

In order not to obscure the disclosure of the present invention, only those portions of a beverage preparing machine, with which the heating unit of the invention is to be utilized, as are necessary for an understanding of the invention are described and illustrated. One skilled in the art should be readily able to practice the invention given the state of the art and the present disclosure. For example, it should be readily understood that a pitcher or other container p (FIG. 5) which holds the prepared beverage will rest on the top of the hot plate 3 (note that FIG. 1 is a bottom plan view and FIGS. 2 to 3 show the parts of the device schematically in their in-use position).

In the following description, like reference numerals are used to designate like structure throughout the various views.

Figure 5:
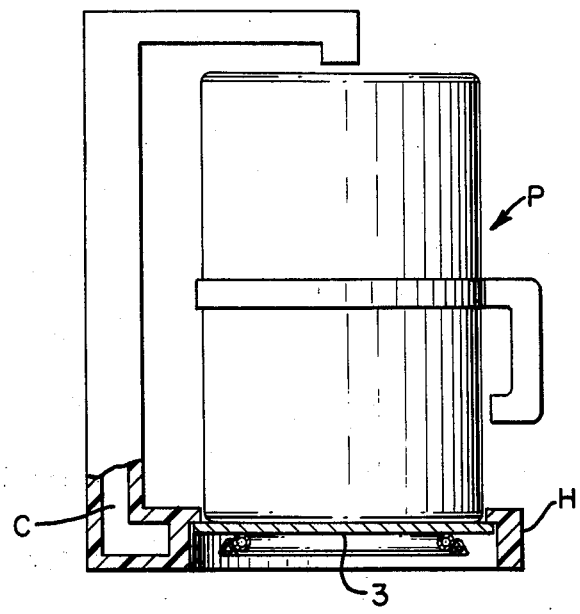
FIG. 5 is a schematic view of a beverage preparing machine utilizing the present invention.

FIG. 5 schematically depicts a beverage container with a pitcher p standing on a hot plate 3, which is supported in plastic housing H. A connection schematically depicted at C extends from the vaporizer tube 1 to a position where the fluid is applied to form the beverage.

Figure 2:
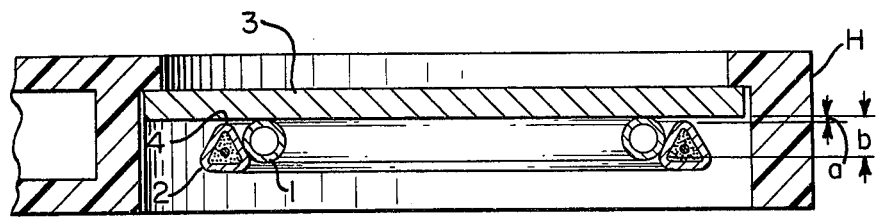
FIG. 2 is a sectional view along line II—II of FIG. 1.
Figure 3:
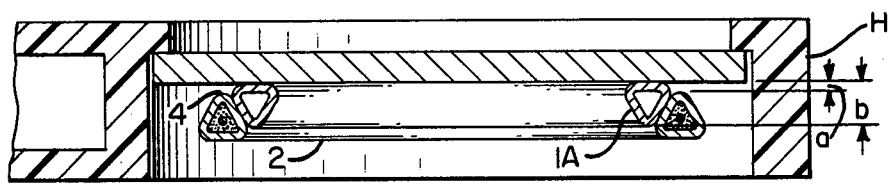
FIG. 3 is a view similar to FIG. 2 which shows a further preferred embodiment having a polygonal cross section vaporizer tube.

The heating unit of the invention depicted in FIGS. 1 and 2 includes a vaporizer tube 1, a tubular heating element 2 concentrically surrounding tube 1, and a hot plate 3. The vaporizer tube 1 and the tubular heating element 2 are arranged on the underside of this hot plate. The vaporizer tube 1 has an inlet 5 for water coming from the container, not shown. The steam produced by the heating action of the tubular heating element 2 escapes from the vaporizer tube 1 through the outlet 6 and passes via a pipe system, not shown, to a discharge point from where it passes via the beverage extract into a vessel, e.g. a pitcher or the like. The tubular heating element 2 is provided at both ends with connecting lugs 7 for electric cables, not shown. A housing H of synthetic resinous material is schematically depicted in the drawings.

The vaporizer tube 1 is connected thermally conductively to the hot plate 3. Hot plate 3 is preferably made of a steel plate. This thermal connection is made by soldering vaporizer tube 1 to the hot plate 3. The vaporizer tube 1 is, in turn, connected heat-conductively to the tubular heating element 2. As can be seen from FIG. 2 of the drawings, tubular heating element 2 is arranged at a distance $a$ from the underside of the hot plate 3. This distance $a$ is less than the total vertical height $b$ of the vaporizer tube 1. In particularly preferred practical embodiments, this distance $a$ is in the range of 1/10 to ½ of the height $b$, with a most preferred ratio of 1/5.

In the embodiment of FIGS. 1 and 2, the tubular heating element 2 has a triangular cross section and faces the underside with one of its edges 4 defined by the intersection of two flat sides. This construction minimizes transfer of radiant heat from the heating element 2 directly to the hot plate 3. The vaporizer tube 1 of this embodiment has a circular cross section.

The embodiment of FIG. 3 is similar to the embodiment of FIGS. 1 and 2, except that the vaporizer tube 1A has a triangular cross section and is connected by soldering to the underside of the hot plate 3 with one of its flat surface areas or sides.

Figure 4:
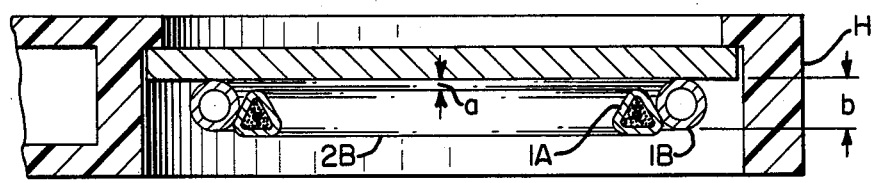
FIG. 4 is a sectional view of yet another preferred embodiment of the present invention.

The embodiment of FIG. 4 is similar to the embodiment of FIGS. 1 and 2, except that the heating element 2B is arranged radially inwardly of the vaporizer tube 1B.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Vaporizing and warming device for beverage-preparing machines, especially for household coffee machines and the like; said device comprising:

a hot plate for keeping the thus-prepared beverage warm, said hot plate having at least two sides, a vaporizer tube carrying water for preparing the beverage, and said vaporizer tube being thermally connected to one side of said hot plate, a heating element yielding the heat required for respective vaporization and warming processes, said heating element being thermally conductively connected with the vaporizer tube and being arranged together with the vaporizer tube at one side of the hot plate, said heating element being arranged laterally offset with respect to the vaporizer tube and with its portion closest to the hot plate being spaced from said hot plate at a perpendicular distance which is smaller than the height of the vaporizer tube perpendicularly to the hot plate, said arrangement of said heating element and the vaporizer tube providing optimum transfer of heat, including primarily radiant heat, to the hot plate, while minimizing the development of localized hot spots in the hot plate.

2. Device according to claim 1, wherein the heating element is tubular and has a polygonal cross section, said heating element facing the hot plate with one of its edges defined by the intersection of two of its flat surfaces.

3. Device according to claim 1, wherein the heating element is tubular and has a polygonal cross section, said heating element facing the hot plate with one of its edges defined by the intersection of two of its flat surfaces.

4. Device according to claim 1, wherein said vaporizer tube and said heating element are arranged at the underside of the hot plate.

5. Device according to claim 1, wherein said heating element is tubular.

6. Device according to claim 4, wherein said heating element is tubular.

7. Device according to claim 3, wherein said hot plate is supported at a synthetic resinous beverage preparing machine housing.

8. Device according to claim 6, wherein said hot plate is supported at a synthetic resinous beverage preparing machine housing.

9. Device according to claim 5, wherein said vaporizer tube is disposed primarily concentrically outside said heating element.

10. Device according to claim 5, wherein said vaporizer tube is disposed primarily concentrically inside said heating element.

11. Device according to claim 1, wherein the perpendicular distance of the heating element from the hot plate is in the range of 1/10 to ½ of the height of the vaporizer tube.

12. Device according to claim 11, wherein said distance is 1/5 of the height of the vaporizer tube.

13. Device according to claim 1, wherein the vaporizer tube has a polygonal cross section and exhibits flat surfaces, and wherein the vaporizer tube rests with one of its flat surfaces on the hot plate.

14. Device according to claim 1, wherein said vaporizer tube is connected to said hot plate by soldering and said heating element is heat conductively connected to said vaporizer tube.

* * * * *